US006909249B2

(12) United States Patent
Otake

(10) Patent No.: US 6,909,249 B2
(45) Date of Patent: Jun. 21, 2005

(54) SWITCHING CONSTANT-CURRENT POWER SUPPLY

(75) Inventor: Tetsushi Otake, Tsurugashima (JP)

(73) Assignee: Toko Kabushiki Kaisha (JP)

( * ) Notice: Subject to any disclaimer, the term of this patent is extended or adjusted under 35 U.S.C. 154(b) by 19 days.

(21) Appl. No.: 10/732,150

(22) Filed: Dec. 9, 2003

(65) Prior Publication Data

US 2004/0119451 A1 Jun. 24, 2004

(30) Foreign Application Priority Data

Dec. 12, 2002 (JP) ........................................ 2002-360669

(51) Int. Cl.[7] .............................................. G05F 1/00
(52) U.S. Cl. ....................... 315/291; 315/307; 315/224; 307/85; 307/86
(58) Field of Search ................................. 315/291, 307, 315/224, 297, 360; 307/85, 86

(56) References Cited

U.S. PATENT DOCUMENTS 6,509,700 B2 * 1/2003 Nakatsuka et al. ......... 315/291

2004/0032223 A1 * 2/2004 Henry ........................ 315/291

FOREIGN PATENT DOCUMENTS

| JP | 53-78418 | 7/1978 | ............. F17B/1/24 |
| JP | 09-065663 | 3/1997 | ......... H02M/7/5383 |
| JP | 10/014236 | 1/1998 | .......... H02M/3/338 |
| JP | 11-069791 | 3/1999 | .......... H02M/3/155 |
| JP | 2000-287460 | 10/2000 | .......... H02M/7/537 |

* cited by examiner

Primary Examiner—Tuyet Thi Vo
(74) Attorney, Agent, or Firm—Renner, Kenner, Greive, Bobak, Taylor & Weber

(57) ABSTRACT

Disclosed herein is a switching constant-current power supply which comprises: a switching-system power converter for supplying a predetermined current to a load; a current detector for generating a feedback signal in correspondence with the load current; a controller for driving the power converter in correspondence with the feedback signal; and a feedback circuit, which is provided between the current detector and the controller, and comprises a signal holding unit, the feedback circuit supplying either a first feedback signal, output from the current detector, or a second feedback signal, output from the signal holding unit, to the controller; the size of the second feedback signal being approximately equal to the first feedback signal at a given time.

8 Claims, 3 Drawing Sheets

SWITCHING CONSTANT-CURRENT POWER SUPPLY

BACKGROUND OF THE INVENTION

1. Field of the Invention

This invention relates to a switching-system constant-current power supply for supplying a stable current to an intermittent load.

2. Description of the Related Art

When using a light-emitting diode (hereinafter "LED") as a light source, the current supply to the LED must be stabilized in order to obtain a constant amount of emitted light, brightness, and the like. As an example, FIG. 4 shows the constitution of a switching constant-current power supply, conventionally used for supplying this type of stabilized current to a load.

In FIG. 4, reference numeral 1 represents an input terminal for receiving power supplied from an external battery, and reference numerals 2a and 2b represent output terminals for stably supplying predetermined current to a load 6 having a plurality of LEDs, connected between them. A power converter 3 is connected between the input terminal 1 and the output terminal 2a, and forms a voltage-boosting chopper converter comprising a choke coil L1, a switching transistor Q1, a rectifying diode D1, and a smoothing capacitor C1.

A detector 5 is connected between the other output terminal 2b and ground, which serves as a reference potential point of the circuit, and detects the current flowing to the load 6 (hereinafter "load current") and generates a feedback signal in correspondence with the load current. A controller 4 is connected between the power converter 3 and the detector 5, and drives the power converter 3 in correspondence with the size of the feedback signal, received from the detector 5.

The power converter 3, the controller 4, and the detector 5 form a switching constant-current power supply.

Explained simply, in the operation of the switching constant-current power supply of FIG. 4, the controller 4 turns the switching transistor Q1 on and off by using an on-duty corresponding to the feedback signal from the detector 5. The size (signal amount) of the feedback signal corresponds not to the output voltage, as in a conventional switching constant-current power supply, but to the output current (=the load current). For this reason, the switching transistor Q1 performs its on-off operation at an on-duty corresponding to the load current. For example, when the load current is lower than a stabilization target value, the voltage between the terminals of the smoothing capacitor C1 is boosted to increase the load current. As a result, the load current of the device in FIG. 4 is stabilized.

Some recent display devices and lighting devices using an LED as a light source aim to conserve power and the like by repeatedly switching the LED on and off at high speed. In such devices, there is inevitably a period when current is flowing to the load (hereinafter "current flow period") and a period when current is not flowing to the load (hereinafter "current cut-off period"). In a switching constant-current power supply where the power for supplying current to the LED has the constitution shown in FIG. 4, the feedback signal from the detector 5 to the controller 4 is approximately zero during the current cut-off periods. In other words, the feedback signal is a pulse rather than a direct current.

Normally, the constitution of the controller 4 is not one which can handle a pulse-shaped feedback signal. When this type of pulse-shaped feedback signal is supplied to the controller 4, during the current cut-off period, the controller 4 attempts to maximize the on-duty of the on/off operation of the switching transistor Q1, and, during the subsequent current flow period, the controller 4 attempts to minimize the on-duty of the on/off operation of the switching transistor Q1. When the on-duty reaches its maximum during the current cut-off period, the voltage between the terminals of the smoothing capacitor C1 abruptly increases, and, in the subsequent current flow period, there is a possibility that a load current greater than the stabilization target value will flow for a comparatively long time.

When the feedback signal is pulse-shaped, it can, for example, be smoothed by a capacitor or the like, and supplied to the controller 4 as a direct current. However, when the pulse-shaped feedback signal is smoothed by a capacitor or the like, the size of the feedback signal at the moment it flows to the controller 4 is approximately equal to an average value over a predetermined period of time. Consequently, in the event of an interrupted non-cyclical load or other such load fluctuation, a long time is required before the load current, which has deviated from the stabilization target value, returns to the target value.

With an intermittent load, the response speed of the control operation along a feedback loop via the choke coil L1, the smoothing capacitor C1, the load 6, the detector 5, and back to the controller 4, is insufficient to keep up with changes in the load, resulting in the possibility of unstable load current.

SUMMARY OF THE INVENTION

Accordingly, it is an object of this invention to provide a switching constant-current power supply, which can stabilize the load current even when the load is repeatedly interrupted.

In order to achieve the above objects, the switching constant-current power supply according to this invention comprises a switching-system power converter for supplying a predetermined current to a load; a current detector for generating a feedback signal in correspondence with the load current; a controller for driving the power converter in correspondence with the feedback signal; and a feedback circuit, which is provided between the current detector and the controller. The feedback circuit comprises a signal holding unit, which refers to a first control signal at a given point while the load current is flowing and creates a second control signal approximately equal to the first control signal; the feedback circuit supplies either the first feedback signal, output from the current detector, or the second feedback signal, output from the signal holding unit, to the controller. The size of the second feedback signal is approximately equal to the first feedback signal at a given time.

A feedback circuit comprises a signal holding unit, and is provided between the current detector for generating a feedback signal in correspondence with the load current, and a controller for driving the power converter in correspondence with the feedback signal. When the load current is flowing, the feedback circuit supplies a first feedback signal, output from the power converter, to the controller, and, when the load current is not flowing, the feedback circuit supplies a second feedback signal, output from the signal holding unit, to the controller.

To realize these functions, the constitution of the feedback circuit divides broadly into a selecting unit and the signal holding unit, which specifically comprises a peak hold circuit and a reset circuit.

The peak hold circuit refers to the first feedback signal, output from the detector, and creates the second feedback signal, which is approximately equal to the maximum value of the first feedback signal during the period when the load current is flowing. Then, when the reset circuit has detected the change from a state where load current is not flowing to one where it is flowing, based on the change in the size of the first feedback signal, the reset circuit returns the peak hold circuit to its initial state.

In the switching constant-current power supply incorporating the feedback circuit as described above, the feedback circuit supplies the first feedback signal to the controller when the load current is flowing, stabilizing the load current by a similar operation as in a control circuit.

On the other hand, when the load current is not flowing in the switching constant-current power supply incorporating the feedback circuit as described above, the feedback circuit supplies the second feedback signal to the controller, so that the on-duty of the on/off operation of the switching transistor does not increase. More specifically, the on-duty is secured at approximately the same size as when the maximum load current was flowing during the current flow period immediately prior to the cessation of load current flow. Therefore, even when the load current is interrupted, there is no problem that the current control operation of the switching constant-current power supply will be unable to keep track of changes in the load due to limitations of the high-speed response of the feedback loop, leading to destabilization of the load current.

DESCRIPTION OF THE PREFERRED EMBODIMENT

Figure 1:
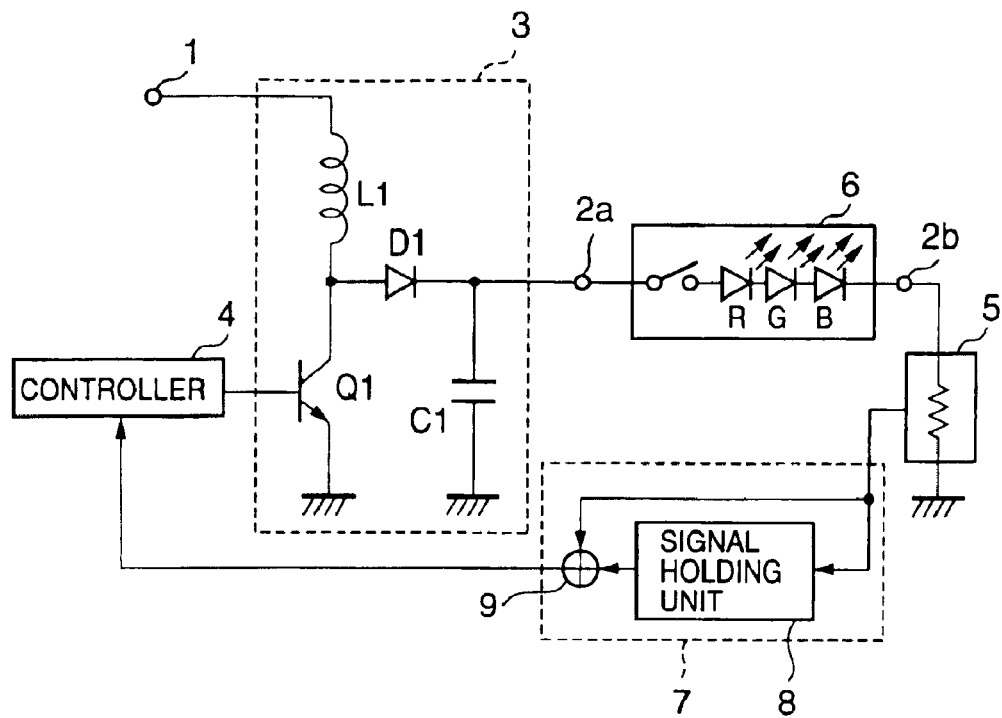
FIG. 1 is a block diagram showing a switching constant-current power supply according to an embodiment of this invention.

FIG. 1 shows a preferred embodiment of the switching constant-current power supply of this invention.

Figure 4:
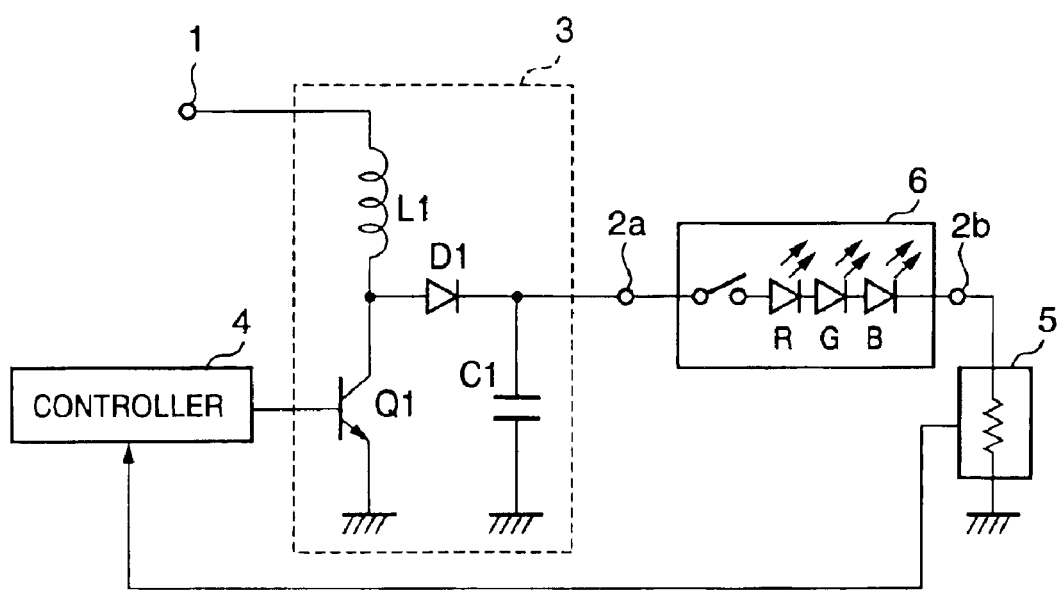
FIG. 4 is a block diagram showing an example of a conventional switching constant-current power supply.

The switching constant-current power supply shown in the block diagram of FIG. 1 is identical to that shown in FIG. 4, with the exception that a feedback circuit 7 is provided between the controller 4 and the detector 5. The constitution of the feedback circuit 7 of FIG. 1 broadly divides into a signal holding unit 8 for creating a second feedback signal, and a selecting unit 9 for supplying to the controller 4 either a first feedback signal output from the detector 5, or the second feedback signal.

Figure 2:
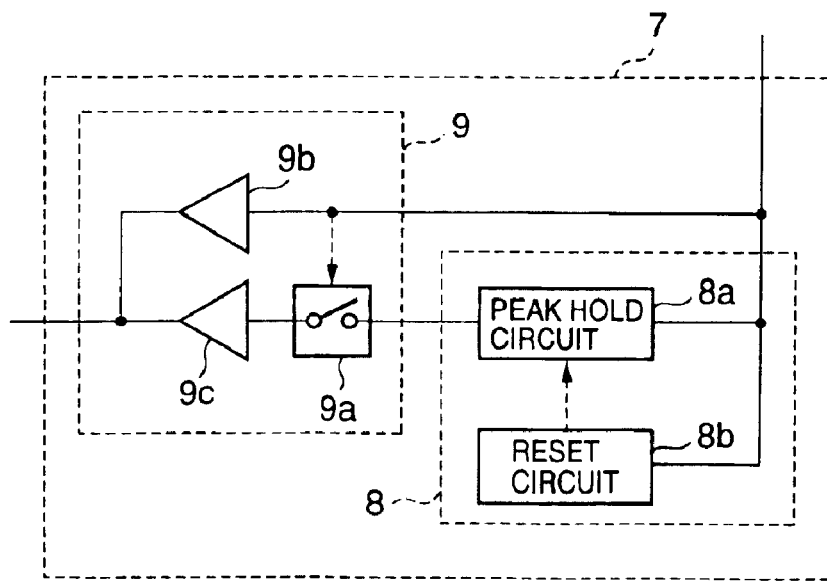
FIG. 2 is a block diagram showing a specific constitution of a feedback circuit, constituting a primary part of this invention.

FIG. 2 is a block diagram showing the specific constitution of the feedback circuit 7 having the above functions.

In FIG. 2, reference numerals 8a and 8b respectively represent a peak hold circuit and a reset circuit, which together constitute the signal holding unit 8, and reference numerals 9a, 9b, and 9c respectively represent a switch circuit, a first buffer circuit, and a second buffer circuit, which together constitute the selecting unit 9.

The input sides of the peak hold circuit 8a, the reset circuit 8b, and the first buffer circuit 9b, are connected to the detector 5 so as to receive the first feedback signal. The output side of the reset circuit 8b connects to the peak hold circuit 8a, and the output side of the peak hold circuit 8a connects to the input side of the second buffer circuit 9c via the switch circuit 9a, which switches on and off in accordance with the first feedback signal. The output sides of the buffer circuits 9b and 9c are connected to the controller 4.

The feedback circuit 7 having the constitution described above operates in accordance with the first feedback signal, supplied from the detector 5, as follows.

Firstly, when the load current is flowing to the load 6 and the detector 5 is outputting a large first feedback signal, the switch circuit 9a is off, and the first feedback signal is supplied to the controller 4 via the first buffer circuit 9b. At this time, the peak hold circuit 8a refers to the first feedback signal, creates a second feedback signal, approximately equal to the maximum value (peak value) of the first feedback signal, and continues outputting the second feedback signal.

When the load current ceases flowing to the load 6 and the first feedback signal from the detector 5 decreases to nearly zero, the switch circuit 9a switches on, and the second feedback signal is supplied via the switch circuit 9a and the second buffer circuit 9c to the controller 4.

Then, at the time of the switch from a state where load current is not flowing to one where it is flowing, the reset circuit 8b, which has detected the switch based on the change in the size of the first feedback signal, returns the peak hold circuit 8a to its initial state. As a result, the peak hold circuit 8a creates a second feedback signal, which is approximately equal to the maximum value (peak value) of the first feedback signal, generated in a new current flow period.

In the switching constant-current power supply comprising this type of feedback circuit 7 shown in FIG. 1, when the load current is flowing, the first feedback signal from the detector 5 is selectively supplied to the controller 4. In this state, the power supply having the constitution shown in FIG. 1 stabilizes the load current by the same operation as that of a conventional power supply.

On the other hand, when the load current is not flowing, the second feedback signal, output from the peak hold circuit 8a, is selectively supplied to the controller 4. The controller 4 receives the supply of the second feedback signal, and secures the on-duty for switching the switching transistor Q1 on and off. At this time, the on-duty is approximately the same size as when the maximum load current was flowing during the current flow period immediately prior to the cessation of load current flow.

When the on-duty of the switching transistor Q1 is secured, the boost in the voltage between the terminals of the smoothing capacitor C1 during the current cut-off period is reduced. Therefore, the load current is unlikely to exceed its target value during the next current flow period. The on-duty of the switching transistor Q1 during the current cut-off period is actually approximately the same as that when current is flowing to the load 6. Consequently, at the time of switching from the state where load current is not flowing to the state where it is flowing, the feedback loop can be rapidly controlled in accordance with the first feedback signal.

As a result of the operation described above, the load current can be stabilized even when the load is repeatedly interrupted.

Figure 3:
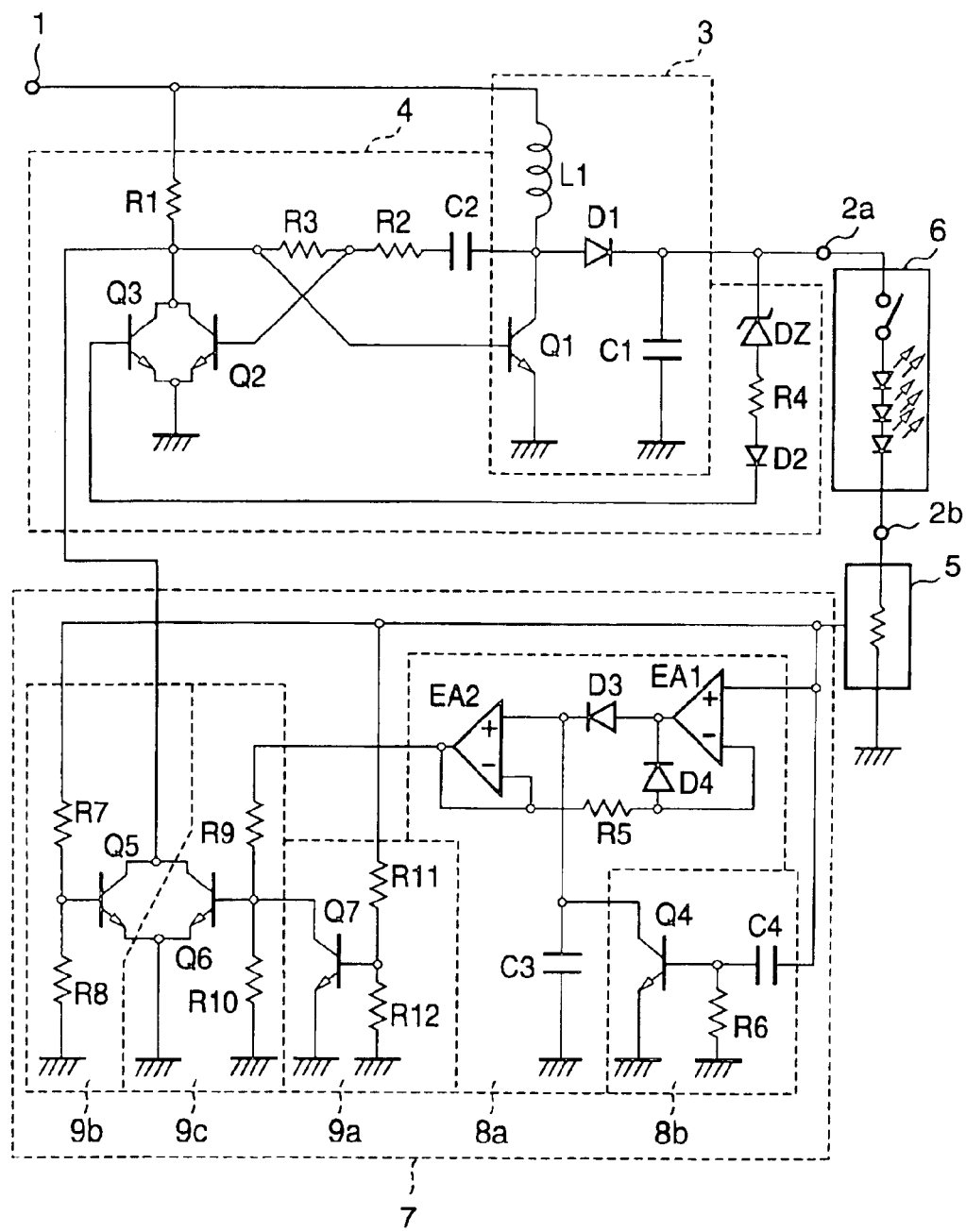
FIG. 3 is a specific circuit diagram of the switching constant-current power supply of this invention.

FIG. 3 shows one example of the specific constitution of the switching constant-current power supply according to this invention.

In the circuit diagram of FIG. 3, other than slight differences resulting from reduction of the number of elements and simplification, the constitutions and self-excited operations of the power converter 3 and the controller 4 are basically the same as those disclosed in Japanese Laid-Open Utility Model Application No. 53-78418, Japanese Laid-Open Patent Applications Nos. 10-14236, 11-69791, 12-287460, and the like.

The feedback circuit 7 is a primary part of this invention, and has the following constitution.

The feedback circuit 7 comprises two error amplifiers EA1 and EA2, the output terminal of the error amplifier EA1 connecting via a diode D3 to a non-invertible side input terminal (+) of the error amplifier EA2. A capacitor C3 is connected between the non-invertible side input terminal (+) of the error amplifier EA2 and ground, and the invertible side input terminal (−) of the error amplifier EA2 connects to the output terminal of the error amplifier EA2. A diode D4 is connected between the invertible side input terminal (−) of the error amplifier EA1 and its output terminal, and a resistor R5 is connected between the invertible side input terminal (−) of the error amplifier EA1 and the output terminal of the error amplifier EA2; the non-invertible side input terminal (+) of the error amplifier EA1 connects to the detector 5.

The error amplifiers EA1 and EA2, the diodes D3 and D4, the resistor R5, and the capacitor C3, constitute the peak hold circuit 8a. Incidentally, the constitution of the peak hold circuit 8a is disclosed in, for example, Japanese Laid-Open Patent Application No. 2002-288990.

A capacitor C4 and a resistor R6 are connected in series between the detector 5 and ground, and the connection point between the capacitor C4 and the resistor R5 connects to the base of a transistor Q4. The collector of the transistor Q4 connects to the connection point between the capacitor C3 and the error amplifier EA2, and its emitter connects to ground. The capacitor C4, the resistor R6, and the transistor Q4, constitute the reset circuit 8b.

Resistors R7 and R8 are connected in series between the detector 5 and ground, and their connection point is connected to the base of a transistor Q5. The emitter of the transistor Q5 connects to ground, and its collector connects to the collector of the transistor Q2 in the controller 4. The resistors R7 and R8, and the transistor Q5, constitute the first buffer circuit 9b.

Resistors R9 and R10 are connected in series between the output terminal of the error amplifier EA2 and ground, and their connection point connects to the base of a transistor Q6. The emitter of the transistor Q6 connects to ground, and its collector connects to the collector of the transistor Q2 in the controller 4. The resistors R9 and R10, and the transistor Q6, constitute the second buffer circuit 9c.

Resistors R11 and R12 are connected in series between the detector 5 and ground, and their connection point connects to the base of a transistor Q7. The emitter of the transistor Q7 connects to ground, and its collector connects to the base of the transistor Q6. The resistors R11 and R12, and the transistor Q7, constitute the switch circuit 9a.

In the circuit of FIG. 3 having the above constitution, when a load current is flowing, the size of the first feedback signal detected by the detector 5 corresponds to the load current. The transistor Q7 consequently switches on, and the transistor Q6 switches off. As a result, a current corresponding to the first feedback signal flows from the controller 4 to the collector of the transistor Q5, whereby the switching transistor Q1 performs its on/off operation using an on-duty corresponding to the first feedback signal.

At this time, the error amplifier EA1 of the peak hold circuit 8a charges the capacitor C3 in accordance with the first feedback signal from the detector 5. Then, the error amplifier EA2 creates a second feedback signal in accordance with the voltage between the terminals of the capacitor C3. Since the output of the error amplifier EA2 is connected to the invertible side input terminal (−) of the error amplifier EA1, the capacitor C3 is charged by the error amplifier EA1 only when the first feedback signal exceeds the second control signal. Therefore, the second control signal is approximately the same size as the maximum value of the first control signal.

Subsequently, when no current is flowing to the load 6, the first feedback signal output from the detector 5 decreases to approximately zero. Consequently, the transistors Q5 and Q7 both switch off, and the transistor Q6 switches on. A current corresponding to the second feedback signal from the controller 4 flows to the transistor Q6, whereby the switching transistor Q1 performs its on/off operation using an on-duty corresponding to the second feedback signal.

The capacitor C4 and the resistor R6 of the reset circuit 8b equivalently comprise a differentiating circuit. Therefore, the transistor Q4, whose base connects to the connection point between the capacitor C4 and the resistor R6, changes from a state where load current is not flowing to a state where load current is flowing, and, when the first feedback signal has increased in a step-like shape, the transistor Q4 switches on for a short time. As a result, the capacitor C3 discharges, and the peak hold circuit 8a returns to its initial state.

In this way, the circuits shown in FIG. 3 realize the switching constant-current power supply shown in the block diagrams of FIGS. 1 and 2, making it possible to stabilize the load current even when the load is repeatedly interrupted.

The above explanation of the preferred embodiment describes a case where the signal holding unit 8 of the feedback circuit 7 is comprised of the peak hold circuit 8a and the reset circuit 8b. However, the signal holding unit 8 need not comprise the peak hold circuit 8a and the reset circuit 8b, but may instead comprise, for example, a sample hold circuit and a trigger circuit.

Instead of returning the peak hold circuit 8a to its initial state in compliance with change in the first feedback signal, output from the detector 5, the reset circuit 8b may return the peak hold circuit 8a to its initial state in compliance with an external signal, which interrupts the load 6. The reset signal for returning the peak hold circuit 8a to its initial state need only be supplied in a cycle exceeding the load interruption cycle; stated more extremely, it is enough that the reset signal is supplied in a timing which is non-synchronous to the interruption of the load.

The power converter 3 is not limited to a voltage-boosting chopper, nor is the controller 4 limited to a self-exciting/PWM control system. The detector 5 may use a detection method other than resistance detection, and an amplifying circuit or a level shift circuit may be added in order to match the size of the first feedback signal to the level required by the controller 4.

Of course, the specific constitution may be modified in various ways without deviating from the main points of the present invention.

As described above, the switching constant-current power supply of this invention provides a feedback circuit, comprising a signal holding unit for generating a second feedback signal, between a detector for generating a first feedback signal in correspondence with current flowing to the load, and a controller for driving the power converter, which supplies current to the load. The feedback circuit supplies the first feedback signal to the controller during a current flow period, and supplies the second feedback signal during the current cut-off period. The second feedback signal is characterized in being approximately the same size as the maximum first feedback signal generated during the current flow period.

This invention prevents the response speed of the current control operation of the feedback loop from being unable to keep up with load fluctuations, and, as a result, enables the load current to be stabilized even when the load is interrupted.

What is claimed is:

1. A switching constant-current power supply comprising:
   a switching-system power converter for supplying a predetermined current to a load;
   a current detector for generating a feedback signal in correspondence with the load current;
   a controller for driving the power converter in correspondence with the feedback signal; and
   a feedback circuit, which is provided between the current detector and the controller, and comprises a signal holding unit, the feedback circuit supplying either a first feedback signal, output from the current detector, or a second feedback signal, output from the signal holding unit, to the controller;
   the size of the second feedback signal being approximately equal to the first feedback signal at a given time.

2. The switching constant-current power supply as described in claim 1, comprising an LED, and supplying a predetermined current to the load, which is interrupted at high speed.

3. A switching constant-current power supply comprising:
   a switching-system power converter for supplying a predetermined current to a load;
   a current detector for generating a feedback signal in correspondence with the load current;
   a controller for driving the power converter in correspondence with the feedback signal; and
   a feedback circuit, which is provided between the current detector and the controller, and comprises a signal holding unit, which refers to a first control signal at a given point while the load current is flowing and creates a second feedback signal approximately equal to the first control signal, the feedback circuit supplying either the first feedback signal, output from the current detector, or the second feedback signal, output from the signal holding unit, to the controller;
   the feedback circuit supplying the first feedback signal to the controller when the load current is flowing, and supplying the second feedback signal to the controller when the load current is not flowing;
   the size of the second feedback signal being approximately equal to the first feedback signal at a given time.

4. The switching constant-current power supply as described in claim 3, comprising an LED, and supplying a predetermined current to the load, which is interrupted at high speed.

5. A switching constant-current power supply comprising:
   a switching-system power converter for supplying a predetermined current to a load;
   a current detector for generating a feedback signal in correspondence with the load current;
   a controller for driving the power converter in correspondence with the feedback signal; and
   a feedback circuit, which is provided between the current detector and the controller, and comprises a signal holding unit, which refers to a first control signal at a given time while the load current was flowing and creates a second feedback signal approximately equal to the first control signal, the signal holding unit comprising a peak hold circuit; the size of the second feedback signal, output from the signal holding unit, being approximately equal to a maximum value of the first feedback signal while the load current is flowing; the feedback circuit supplying the first feedback signal to the controller when the load current is flowing, and supplying the second feedback signal to the controller when the load current is not flowing;
   the size of the second feedback signal being approximately equal to the first feedback signal at a given time.

6. The switching constant-current power supply as described in claim 5, comprising an LED, and supplying a predetermined current to the load, which is interrupted at high speed.

7. A switching constant-current power supply comprising:
   a switching-system power converter for supplying a predetermined current to a load;
   a current detector for generating a feedback signal in correspondence with the load current;
   a controller for driving the power converter in correspondence with the feedback signal; and
   a feedback circuit, which is provided between the current detector and the controller, and comprises a signal holding unit, which refers to a first control signal at a given time while the load current was flowing and creates a second feedback signal approximately equal to the first control signal, the signal holding unit comprising a peak hold circuit; the size of the second control signal, output from the signal holding unit, being approximately equal to a maximum value of the first feedback signal while the load current is flowing; the signal holding unit further comprising a reset circuit, which returns the peak hold circuit to its initial state when the load current has switched from a state of flowing to a state of not flowing; the feedback circuit supplying either the first feedback signal, output from the current detector, or the second feedback signal, output from the signal holding unit, to the controller;
   the feedback circuit supplying the first feedback signal to the controller when the load current is flowing, and supplying the second feedback signal to the controller when the load current is not flowing;
   the size of the second feedback signal being approximately equal to the first feedback signal at a given time.

8. The switching constant-current power supply as described in claim 7, comprising an LED, and supplying a predetermined current to the load, which is interrupted at high speed.

* * * * *